US009754000B2

(12) United States Patent
Kreindlina et al.

(10) Patent No.: US 9,754,000 B2
(45) Date of Patent: Sep. 5, 2017

(54) INTEGRATION SCENARIO FOR MASTER DATA WITH SOFTWARE-AS-A-SERVICE SYSTEM

(71) Applicants: Olga Kreindlina, Heidleberg (DE); Oliver Berger, Hockenheim (DE); Santhosh N, Bangalore (IN); Karthik Narayanan Mohan, Bangalore (IN); Walter Zimmermann, Walldorf (DE); Torsten Buecheler, Speyer (DE); Sophie Kraut, Bad Schoenborn (DE); Albert Neumueller, St. Leon-Rot (DE); Steffen Witt, Heidelberg (DE); Dietmar Henkes, Schwetzingen (DE); Guang Yang, Bad Schoenborn (DE); Thomas Vogt, Neustadt a.d.W. (DE); Matthias Becker, Bruchsal (DE); Martin Haerterich, Wiesloch (DE); Stefan Moeller, Dielheim (DE); Kritesh Vasing, Bangalore (IN); Knut Heusermann, Bad Schoenborn (DE); Christian Hohmann, Mannheim (DE); Marcus Echter, Heidelberg (DE); Xenia Rieger, Karlsruhe (DE); Mohit V. Gadkari, Bangalore (IN); Mukesh Kumar, Bangalore (IN)

(72) Inventors: Olga Kreindlina, Heidleberg (DE); Oliver Berger, Hockenheim (DE); Santhosh N, Bangalore (IN); Karthik Narayanan Mohan, Bangalore (IN); Walter Zimmermann, Walldorf (DE); Torsten Buecheler, Speyer (DE); Sophie Kraut, Bad Schoenborn (DE); Albert Neumueller, St. Leon-Rot (DE); Steffen Witt, Heidelberg (DE); Dietmar Henkes, Schwetzingen (DE); Guang Yang, Bad Schoenborn (DE); Thomas Vogt, Neustadt a.d.W. (DE); Matthias Becker, Bruchsal (DE); Martin Haerterich, Wiesloch (DE); Stefan Moeller, Dielheim (DE); Kritesh Vasing, Bangalore (IN); Knut Heusermann, Bad Schoenborn (DE); Christian Hohmann, Mannheim (DE); Marcus Echter, Heidelberg (DE); Xenia Rieger, Karlsruhe (DE); Mohit V. Gadkari, Bangalore (IN); Mukesh Kumar, Bangalore (IN)

(73) Assignee: SAP SE, Walldorf (DE)

( * ) Notice: Subject to any disclaimer, the term of this patent is extended or adjusted under 35 U.S.C. 154(b) by 384 days.

(21) Appl. No.: 13/724,565

(22) Filed: Dec. 21, 2012

(65) Prior Publication Data
US 2014/0181020 A1  Jun. 26, 2014

(51) Int. Cl.
*G06F 7/00* (2006.01)
*G06F 17/00* (2006.01)
*G06F 17/30* (2006.01)

(52) U.S. Cl.
CPC .............................. *G06F 17/30575* (2013.01)

(58) Field of Classification Search
CPC ............... G06F 17/00; G06F 17/30212; G06F 17/30174; G06F 17/30575; G06F 9/4862; G06F 11/1492; G06F 3/065
See application file for complete search history.

(56) References Cited

U.S. PATENT DOCUMENTS 6,202,085 B1 * 3/2001 Benson et al. ................ 709/205
7,783,604 B1 * 8/2010 Yueh ............................. 707/640
(Continued)

OTHER PUBLICATIONS

Saas Integration for Software Cloud, Liu et al, IEEE 3rd International Conference on Cloud Computing, 2010.*
(Continued)

*Primary Examiner* — Augustine K Obisesan
(74) *Attorney, Agent, or Firm* — Brake Hughes Bellermann LLP

(57) ABSTRACT

According to one general aspect, a method may include replicating, to a software-as-a-service application, a plural-
(Continued)

ity of pieces of master data from a physically remote master database. The method may also include converting the plurality of pieces of master data into one or more pieces of local data of the software-as-a-service application. The method may include changing one or more of either the pieces of master data or the pieces of local data. The method may further include synchronizing the changed pieces of either master data or local data between the remote master database and the software-as-a-service application.

18 Claims, 6 Drawing Sheets

(56) References Cited

U.S. PATENT DOCUMENTS

| | | | |
|---|---|---|---|
| 8,560,568 B2* | 10/2013 | Gilder et al. | 707/770 |
| 2008/0147745 A1* | 6/2008 | Wilkinson et al. | 707/200 |
| 2009/0172082 A1* | 7/2009 | Sufuentes | 709/203 |
| 2009/0254642 A1* | 10/2009 | Geist | 709/222 |
| 2010/0179940 A1* | 7/2010 | Gilder et al. | 707/622 |
| 2010/0250712 A1* | 9/2010 | Ellison et al. | 709/219 |
| 2011/0066681 A1* | 3/2011 | Shiota et al. | 709/203 |
| 2011/0110647 A1* | 5/2011 | Prorock et al. | 386/264 |
| 2011/0126168 A1* | 5/2011 | Ilyayev | 717/103 |
| 2011/0161289 A1* | 6/2011 | Pei et al. | 707/613 |
| 2011/0276537 A1* | 11/2011 | Jegerlehner et al. | 707/620 |
| 2012/0095973 A1* | 4/2012 | Kehoe et al. | 707/694 |
| 2012/0246297 A1* | 9/2012 | Shanker et al. | 709/224 |
| 2013/0042229 A1* | 2/2013 | Jang | 717/171 |

OTHER PUBLICATIONS

An Assessment of Middleware Platforms for Accessing Remote Services, Kwon et al., IEEE International Conference on Services Computing, 2010.*

Efficient I/O intensive multi tenant SaaS system using L4 level cache, Takahashi et al, Fifth IEEE International Symposium on Service Oriented System Engineering, 2010.*

Hardware as a Service (HaaS): The completion of the cloud stack, Stanik et al, 8th International conference on computing technology and information management (ICCM), pp. 830-835, Apr. 2012.*

* cited by examiner

200

300

400

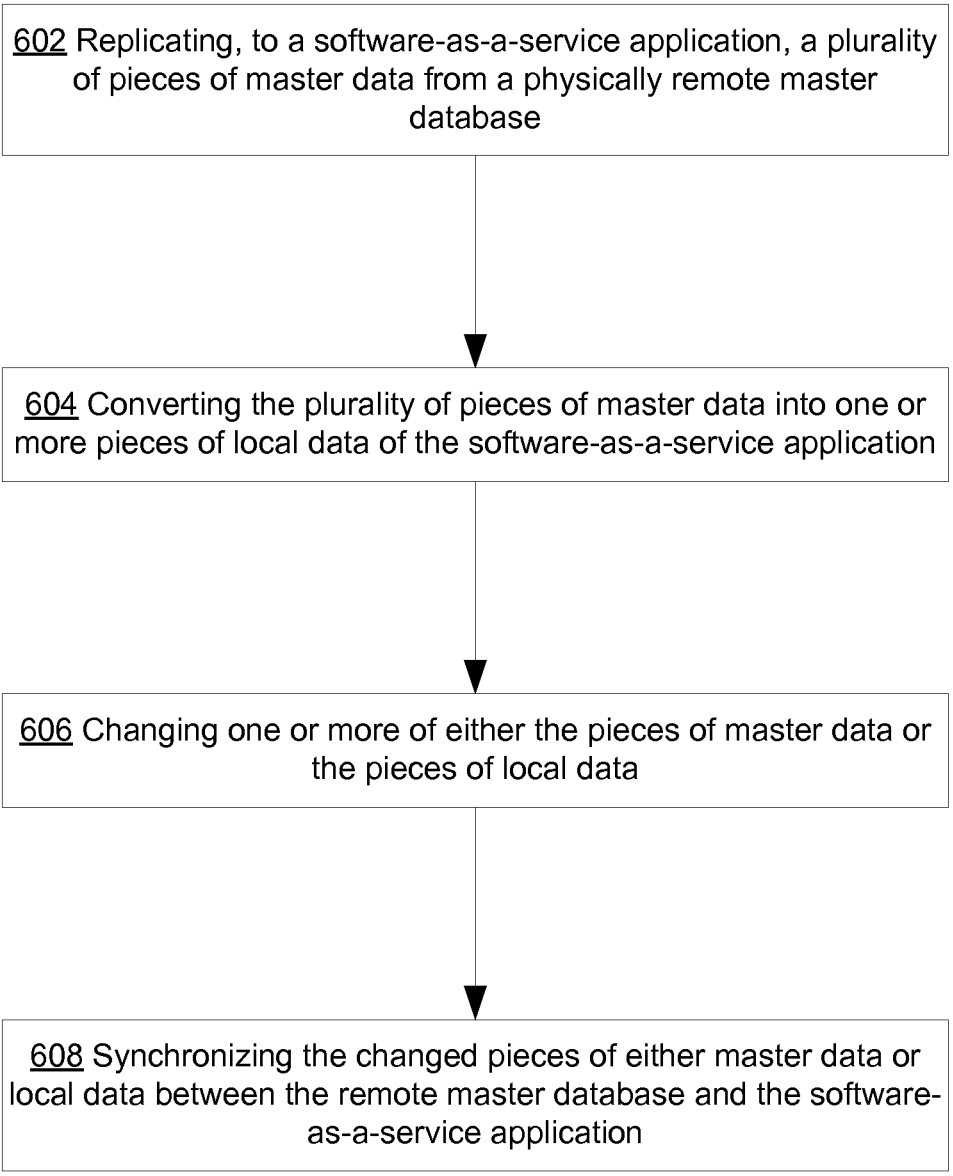

INTEGRATION SCENARIO FOR MASTER DATA WITH SOFTWARE-AS-A-SERVICE SYSTEM

TECHNICAL FIELD

This description relates to generally maintaining and synchronizing data, and more specifically using a software-as-a-service apparatus with a second device that includes master data.

BACKGROUND

Traditionally, large infrastructure level software applications have been locally installed and executed on a customer's computing machine, either as a stand-alone application or as an internal client-server system. Alternatively, a customer may purchase a mainframe or multi-headed system in which the application is executed by a single centralized machine and multiple users may access the machine via a plurality of individual keyboards and screens (colloquially referred to as "heads").

Software as a service (SAAS or SaaS) is a model of software deployment where an application is hosted, in whole or part, as a service provided to customers across a network (e.g., the Internet, etc.). By eliminating the need to install and run the entire application on the customer's own computer, SAAS often alleviates the customer's burden of software maintenance, ongoing operation, and support. Conversely, customers often relinquish control over the software. Also, using SAAS can typically reduce the up-front expense of software purchases, through less costly, often on-demand pricing. From the software vendor's standpoint, SAAS has the attraction of providing stronger protection of its intellectual property, establishing an ongoing revenue stream, and attracting customers who might traditionally be priced out of the market. In general, a SAAS software vendor may host the application on its own server, or this function may be handled by a third-party application service provider (ASP).

Enterprise resource planning (ERP) is typically the planning of how business resources (e.g., inventory, employees, customers, etc.) are acquired and flow through the business process associated with each resource. Frequently, ERP includes the capture, storage and analysis of information relating to the tracked resources. In various cases ERP may be divided into sub-categories or systems pertaining to financials, human capital management, materials management, customer relationship management, sales & distribution, and production planning, corporate services, and/or general operations management. In general, a well-executed ERP system enhances productivity and provides insight to a business. Often an ERP customer may wish to keep their ERP data secret from their competitors and more generally the world.

Customer relationship management (CRM) is typically the practice of intelligently finding, marketing to, selling to, and servicing customers. Frequently, CRM includes the capture, storage, and analysis of information relating to customers, vendors, partners, and/or internal systems. Often a customer may wish to keep their customer relationship management data secret from their competitors and more generally the world.

SUMMARY

According to one general aspect, a method may include replicating, to a software-as-a-service application, a plurality of pieces of master data from a physically remote master database. The method may also include converting the plurality of pieces of master data into one or more pieces of local data of the software-as-a-service application. The method may include changing one or more of either the pieces of master data or the pieces of local data. The method may further include synchronizing the changed pieces of either master data or local data between the remote master database and the software-as-a-service application.

According to another general aspect, an apparatus may include a memory, a network interface and a processor. The memory may be configured to store a plurality of pieces of master data and local data. The network interface may be configured to receive, from a physically remote master database, a plurality of pieces of master data to be replicated. The processor may be configured to convert the plurality of pieces of master data into one or more pieces of local data, and change one or more of either the pieces of master data or the pieces of local data. The apparatus may be further configured to synchronize the changed pieces of either master data or local data with the remote master database.

According to another general aspect, a computer program product for synchronizing master data with a software-as-a-system apparatus may be tangibly embodied on a non-transitory computer-readable medium. The computer program product may include executable code that, when executed, is configured to cause the software-as-a-system apparatus to: replicate, to the software-as-a-service application, a plurality of pieces of master data from a physically remote master database; convert the plurality of pieces of master data into one or more pieces of local data of the software-as-a-service application; change one or more of either the pieces of master data or the pieces of local data; and synchronize the changed pieces of either master data or local data between the remote master database and the software-as-a-service application.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 6 is a flowchart of an example embodiment of a technique in accordance with the disclosed subject matter.

Like reference symbols in the various drawings indicate like elements.

DETAILED DESCRIPTION

Figure 1:
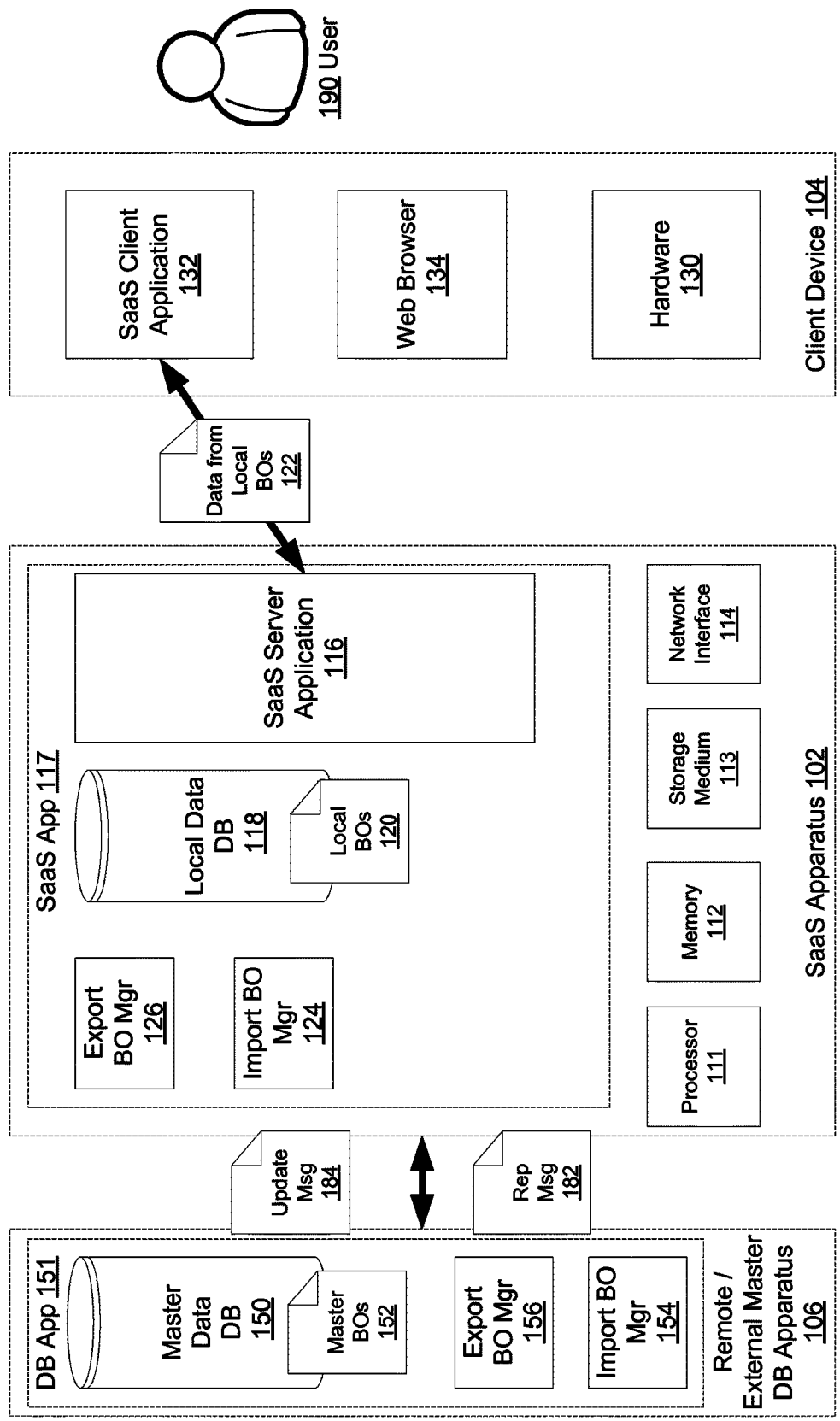
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include three or more devices or sub-systems. In the illustrated embodiment, the system 100 may include a client device 104, a system-as-a-service (SaaS) apparatus 102, and one or more master database (DB) apparatuses or devices 106. In various embodiments, the master DB apparatus 106 may be an external or separate device than the SaaS apparatus 102. In some embodiments, the master DB 106 may include a device that is physically remote (e.g., in another building, another city, another sate/province, or another country, etc.) from the SaaS apparatus 102.

In yet another embodiment, the master DB apparatus 106 may be operated by a different entity than the SaaS apparatus 102. For example, in one embodiment, the SaaS apparatus 102 may be hosted or operated by a SaaS company. The Master DB apparatus 106 may be operated or hosted by another business (e.g., a shoe company, a manufacturing business, etc.).

In an example embodiment, the business operating the master DB apparatus 106 will be referred to as "the manufacturing business"; although, it is understood that the above is merely one illustrative example to which the disclosed subject matter is not limited. In one embodiment, the manufacturing business may have previously (or simultaneously in some embodiments) operated a database application 151 (e.g., an ERP application, etc.) that included a relatively large amount of information about the business (e.g., customers, sales orders, inventory, prices, costs, etc.). Traditionally, such a DB application 151 may have been only usable by users physically located within the company or behind a corporate firewall or other security system that limited the exposure and usability of the DB application 151.

In addition to the DB application 151, the manufacturing business may lease or rent the use of the software service (e.g., SaaS Application 117) provided by the SaaS apparatus 102. This SaaS application 117 may then in turn be used by the manufacturing company's users 190. In various embodiments, the user 190 may use a client device 104 (e.g., a laptop, a tablet, a desktop computer, a smartphone, etc.) to access and use the SaaS application 117, or at least a portion of it.

In this example, the manufacturing company may wish to provide some or a portion of the information in the DB application 151 to users 190. Traditionally, it may not be possible, feasible, and/or desirable for the user 190 to directly access the DB application 151. For example, the users 190 may be on the "wrong" side of the corporate firewall, the users 190 may be physically remote from the network connected to the DB apparatus 106, the DB application 151 may be an older application whose direct use by users 190 is deprecated, the DB application 151 may an application used by a first part of the company (e.g., manufacturing and delivery, etc.) and the SaaS application 117 may be used by a second portion of the company (e.g., sales), etc. It is understood that the above are merely a few illustrative examples to which the disclosed subject matter is not limited.

In such an embodiment, the system 100 may be configured to allow data stored within the DB application 151 to be replicated to the SaaS application 117 and then used by the user 190. Further, system 100 may be configured to synchronize changes in the data between the SaaS application 117 and the DB application 151. For example, in one embodiment, the user 190 may edit or create data via the client device 104 that is subsequently stored in the SaaS application 117. This new data may then be transmitted to and stored by the DB application 151. Conversely, in another embodiment, data may be changed on or via the DB application 151 by another user (not illustrated) and this data may be synchronized to the SaaS application 117. It is understood that the above are merely a few illustrative examples to which the disclosed subject matter is not limited.

Returning to the more general embodiment illustrated by FIG. 1, in one embodiment, the SaaS apparatus 102 may include a computing device, such as, for example, a desktop personal computer, a laptop, a blade server, a dedicated server device, etc. or a virtual machine or a pool of devices thereof. In various embodiments, the SaaS apparatus 102 may include a processor 111 configured to execute one or more machine executable instructions or pieces of software, firmware, or a combination thereof. The SaaS apparatus 102 may include, in some embodiments, a memory 112 configured to store on or more pieces of data, either temporarily, permanently, semi-permanently, or a combination thereof. Further, the memory 112 may include volatile memory, non-volatile memory or a combination thereof. In various embodiments, the SaaS apparatus 102 may include a storage medium 113 configured to store data in a semi-permanent or substantially permanent form. In various embodiments, the storage medium 113 may be included by the memory 113. In some embodiments, the SaaS apparatus 102 may include one or more network interfaces (NIs) 114 each configured to associate with and communicate via one or more communication networks (e.g., a wired network, a wireless network, a cellular network, etc.). In some embodiments, the SaaS apparatus 102 may include other hardware devices or components (e.g., a monitor or display, a human interface device, keyboard, mouse, touchpad, etc.) not illustrated. In various embodiments, one or more of the hardware devices (e.g., processor 111, memory 112, storage medium 113, network interface 114, etc.) may be virtual or logical as opposed to physical.

In one embodiment, the SaaS apparatus 102 may include or execute an SaaS application 117 that provides a service or a set of functionality to a tenant or client user or other device (e.g., client device 104, SaaS client application 132, etc.). In some embodiments, this SaaS application 117 may include a web service or a software system configured to support interoperable machine-to-machine interaction over a network. In various embodiments, other systems (e.g., client device 104, Master DB apparatus 106, etc.) may interact with the SaaS application 117 in a predefined manner using common web protocols or formats.

For example, in one embodiment, the SaaS application 117 or the SaaS Server Application 116 may be configured to provide or generate a web site that may be accessed by the client device 102. In this context, a "web site" may include a collection or grouping of related web pages that are generally viewable or understandable (once rendered by the web browser 118) to the user 190. In various embodiments, when a web site (e.g., web site 170, etc.) is accessed via a communications network, the web site may be accessed via the Hypertext Transfer Protocol (HTTP) or Hypertext Transfer Protocol Secure (HTTPS). However, in another embodiment, the SaaS Server Application 116 may communicate with the SaaS Client Application 132 via other protocols, such as, a Remote Procedure Call (RPC), etc. It is understood that the above are merely a few illustrative examples to which the disclosed subject matter is not limited.

In this context, a "web page" includes a file or document which is a portion of a web site. In various embodiments, such web pages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, etc. In various embodiments, the web browser 134 may process one or more web pages in order to render one web page. For example, an HTML web page may be modified or include other web pages, such as, JavaScripts, a CSS file, various images, etc. In this context, a web page that includes, often by reference, other web pages is referred to as a "base web page". For example, when a user 190 views a "web page" from a web site that web page is often a "base web page" that includes graphics, and CSS styles, etc. Generally, the location or address bar of the web browser 134 merely displays the URL of the base web page (e.g., http://www.sap.com/index.html, etc.), and not each incorporated or subordinate web page (e.g., a logo graphic, such as, http://www.sap.com/logo2w.png, etc.). It is understood that the above is merely one illustrative example to which the disclosed subject matter is not limited.

In another embodiment, the SaaS application 117 may communicate with the DB application 151 via other means besides web pages. For example, in one embodiment, messages may be transmitted between the two devices 102 and 106 in a format that employs a substantially text-based messaging scheme, such as, Simple Object Access Protocol (SOAP), Web Services Description Language (WSDL), JavaScript Object Notation (JSON), XML, etc. In another embodiment, messages may be transmitted between the two devices 102 and 106 in a format that employs an at least partially binary-based messaging scheme, such as, binary RPC, binary XML, object serialization, Common Object Request Broker Architecture (CORBA), etc. In these or other various embodiments, the messages between the two devices 102 and 106 may be transmitted using a variety of protocols, such as, HTTP, HTTPS, Simple Mail Transfer Protocol (SMTP), etc. It is understood that the above are merely a few illustrative examples to which the disclosed subject matter is not limited.

In various embodiments, the SaaS application 117 may store a plurality of business objects (BOs) 120 locally. In this context, a "business object" includes a collection of variables, data structures, and/or procedures stored as an entity that is related to the business served by the SaaS application 117. In various embodiments, "business object" may form a basic building block of object-oriented programming model. In various embodiments, the variables or data structures included by the business objects 120 or 152 may be referred to as data fields, data values, or pieces of data. In the illustrated embodiment, the local business objects 120 may be stored within a local data DB 118.

In various embodiments, the local BOs 120 may be read, written to, edited, created or deleted by the SaaS application 117 as a whole and more specifically by the SaaS server application 116. As described above, in one embodiment, the SaaS server application 116 may provide or create a web site that allows or facilitates the access and manipulation of the local BOs 120 by a user 190.

For example, in one embodiment, the SaaS application 117 may allow users or sales representatives 190 to view products on offer, manage client information and potential client information, enter and check a sales order, or any other tasks or functions that a sales representative 190 may find useful, desirable, or required. It is understood that the above is merely one illustrative example to which the disclosed subject matter is not limited.

In the illustrated embodiment, the user 190 may access the SaaS application 117 via a client device 104. In one embodiment, the client device 104 may include a computing device, such as, for example, a desktop personal computer, a laptop, a tablet, a smartphone, a netbook, a thin-client, etc. or a virtual machine thereof. In such an embodiment, the client device 104 may include a number of hardware components 130, such as or similar to those described in reference to the SaaS apparatus 102 above.

In various embodiments, the client device 104 may execute or run a SaaS client application 132 that displays a user interface (UI) to the user 190 and facilitates the manipulation of data by the user 190 and the transfer of data 122 between the SaaS server application 116 and the SaaS client application 132. In various embodiments, the local BOs 120 themselves may be transferred between the two devices 102 and 104. In another embodiment, only particular fields, variables, or pieces of data included by the local BOs 120 may be included by the transferred data 122. In yet another embodiment, a combination of whole and partial BOs 120 may be included in the transferred data 122. In some embodiments, the SaaS client application 132 may be configured to retrieve data from other devices (not illustrated). For example, a local BO 120 may include a link or uniform resource identifier (URI) to a document, such as a product manual, etc., hosted on a third device (not illustrated). The SaaS client application 132 may be configured to read the URI and retrieve the document. It is understood that the above are merely a few illustrative examples to which the disclosed subject matter is not limited.

In some embodiments, the SaaS client application 132 may include a separate distinct piece of executable code. In another embodiment, the SaaS client application 132 may be executed or displayed with a web browser 134 (e.g., if the SaaS server application 116 provides a web site, etc.). It is understood that the above are merely a few illustrative examples to which the disclosed subject matter is not limited.

In one embodiment, the user 190 may request data that is not that is not within the local data DB 118. In such an embodiment, the SaaS application 117 may request the data from the DB application 151 which is executed or run by the remote and/or external master DB apparatus 106.

In one embodiment, the master DB apparatus 106 may include a computing device, such as, for example, a desktop personal computer, a laptop, a blade server, a dedicated server device, etc. or a virtual machine or a pool of devices thereof. In such an embodiment, the master DB apparatus 106 may include a number of hardware components (not shown), such as or similar to those described in reference to the SaaS apparatus 102 above.

In the illustrated embodiment, the DB application 151 may act as the master repository of data in the system in that the data or master BOs 152 stored by the DB application 151 may be considered to include the "official" or most accurate version of the data. For example, in one embodiment, the user 190 may be an independent contractor, whereas the Master DB apparatus 106 and DB application 151 are operated by employees of the hiring company. In such an embodiment, the company that hired the independent contractor 190 (e.g., the manufacturing company of the above example, etc.) may desire to have the data they company controls and maintains be considered more accurate or more inclusive than the data (local BOs 120) directly available to the independent contractors 190. It is understood that the above is merely one illustrative example to which the disclosed subject matter is not limited.

In one embodiment, the master BOs 152 may be stored in a different format than the local BOs 120. In another embodiment, master BOs 152 may include different values than the local BOs 120. For example, customer numbers may differ between the two systems, currencies used for price may differ, or other differences between the values included by the BOs 152 and 120 may exist. In yet another embodiment, master BOs 152 may simply not be the same business objects as the local BOs 120. For example, in one embodiment, the master DB application 151 may include inventory BOs 152 that are based on system components (e.g., models of integrated electronic circuits, etc.); conversely, the SaaS application 117 may include product BOs that are based on assembled systems (e.g., motherboards, chipsets, etc.). However, in some embodiments, the master BOs 152 and local BOs 120 may be substantially the same. In various embodiments, the master data DB 150 and the local data DB 118 may include one or more or even other BO mismatches, combinations, or similarities as those described above. It is understood that the above are merely a few illustrative examples to which the disclosed subject matter is not limited.

In such an embodiment, once a master BO 152 or the a piece of data included by a particular master BO 152 is selected to be copied or replicated to the SaaS application 117, the master BO 152 may be processed or converted by an export BO manager 156. More detailed looks at example embodiments of this process are described in relation to FIGS. 3 and 4 below. A brief and generalized overview of such a process is immediately described.

In one embodiment, the export BO manager 156 may be configured to select the desired piece of data from the master BO 152. In various embodiments, the export BO manager 156 may be configured to may be configured to reformat the piece of data or master BO 152 into a format suitable for transfer across a network. As described above, in some embodiments, this may include packaging the piece of data or master BO 152 into a substantially text-based format (e.g., SOAP, etc.).

In various embodiments, the formatted piece of data or master BO 152 may be transmitted to the SaaS apparatus 102 or SaaS application 117 as a replication message 182. In various embodiments, an individual replication message 182 may be used for each piece of data or master BO 152. In another embodiment, an individual replication message 182 may include a number of pieces of data or master BOs 152.

Upon receipt of the replication message 182 by the SaaS application 117, the replication message 182 may be processed by an import BO manager 124 included by the SaaS application 117. In such an embodiment, the import BO manager 124 may be configured to convert the received pieces of master data into one or more local pieces of local data.

As described above, in various embodiments, the pieces of master data may not be in a format or include values that are directly usable by the SaaS application 117 or convenient for storage as a local BO 120. In such an embodiment, the import BO manager 124 may be configured to, as needed, convert the received prices of master data to a new format or a new value. In one embodiment, the data values may mapped from a master data value (e.g., customer #12345, etc.) to a corresponding local data value (e.g., customer #345, etc.). In some embodiments, the mapping procedure may include a lookup table or other straight forward scheme (e.g., using a subset or sub-string of piece of master data, concatenating two pieces of master data, changing a date formatted in a MM-DD-YY fashion to a date formatted in a YYYY/MM/DD fashion, etc.). In another embodiment, the mapping procedure may include calculating or synthesizing a local piece of data or data value based upon a predefined set of rules using one or more pieces of master data (e.g., converting a customer street address, zip code, and amount of annual sales into a local data value that represents a responsible sales representative or sales region, etc.). It is understood that the above are merely a few illustrative examples to which the disclosed subject matter is not limited.

In various embodiments, these conversion or mapping procedures or rules may have been preconfigured during the setup or installation of the SaaS application 117, either for the SaaS application 117 in general or for a particular tenant or client. In some embodiments, the alterations of the pieces of master data may include portions that are not directly viewable or known to the tenant or client. For example, in a multi-tenant system in which a plurality of tenants are serviced by the SaaS application 117 or the local data DB 118, one or more of the pieces of master data or received master BOs 152 may be prefixed with a tenant identifier (ID) that is used internally to by the SaaS application 117 but may be hidden from or removed before the user 190 sees the data.

In various embodiments, multi-tenancy may be an architectural principle, wherein a single instance of a software program runs or executes on a software-as-a-service (SaaS) vendor's servers (e.g., SaaS apparatus 102, etc.), serving multiple client organizations or tenants (not shown). In one embodiment of the multi-tenant architectural concept, a software application may be designed to virtually partition its data and/or configuration so that each tenant works with a customized virtual application instance. Each tenant has a virtual "view" of the data and/or processes related to that tenant. Multi-tenant architecture is designed, in various embodiments, to allow tenant-specific configurations of the user interface (UI) (e.g., branding, etc.), business processes and data models. In some embodiments, such customization and partitioning may be enabled without changing the service software. In such an embodiment, the same service software may be shared by all tenants; therefore, transforming system customization into system configuration.

In the illustrated embodiment, once the pieces of master data have been converted, or not as need be, the pieces of now local data may be entered into or formed into a local BO 120. This local BO 120 may then be stored in the local data DB 118, either replacing or altering an existing local BO 120 or as a new local BO 120. As described above, this local BO 120, or portions thereof, may be provided to the user 190. The user 190 may manipulate, edit, delete, or otherwise alter the local BO 120 as allowed by the SaaS server application 116, as described above.

In various embodiments, one or more local BOs 120 may be changed (e.g., by the user 190, as described above, etc.). In such an embodiment, the SaaS application 117 may synchronize the changes with the master DB application 151.

In one embodiment, the changed local BOs 120 may be provided to a SaaS export BO manager 126. Similarly the Master DB application's export BO manager 156, the SaaS application's export BO manager 126 may be configured to may be configured to select the desired piece(s) of data from the local BO 120. In various embodiments, the export BO manager 126 may be configured to reformat the piece of data or local BO 120 into a format suitable for transfer across a network. As described above, in some embodiments, this may include packaging the piece of data or local BO 120 into a substantially text-based format (e.g., SOAP, etc.).

In various embodiments, the formatted piece of data or local BO 120 may be transmitted to the master DB apparatus 106 or master DB application 151 as a update message 184.

In various embodiments, an individual update message 184 may be used for each piece of data or local BO 120. In some embodiments, this replication message 184 may occur in an asynchronous fashion such that the sender need not wait for a response from the receiver. In another embodiment, an individual update message 184 may include a number of pieces of data or local BOs 120.

Upon receipt of the update message 184 by the master DB application 151, the update message 184 may be processed by an import BO manager 154 included by the master DB application 151. In such an embodiment, the import BO manager 154 may be configured to convert the received pieces of local data into one or more master pieces of master data, similarly to that described above. Eventually, the import BO manager 154 delete, replace, or alter an existing master BO 152 or create a new master BO 152 based upon the converted pieces of master data, similarly to that described above.

Likewise, one or more master BOs 152 may be changed (e.g., by a user of the master DB application, etc.). In such an embodiment, the master DB application 151 may synchronize the changes with the SaaS application 117 in a manner similarly to that described above in regards to the replication message 182.

In various embodiments, the synchronization between the two machines 102 and 106 may occur based on a predefined timer or period of time. In another embodiment, the synchronization may occur on an as-needed based causing a update message 184 in response to a change event or changing BO 120 or 152. In some embodiments, replication may occur as a number of atomic operations in substantially real-time or as-needed, or in another embodiment, the replication may occur in a batch mode or a plurality of grouped changes. In yet another embodiment, a periodic synchronization scheme may be primarily employed but may be overridden (causing an asynchronous synchronization event) if a threshold number of changes has been detected before the predefined time period has expired. It is understood that the above are merely a few illustrative examples to which the disclosed subject matter is not limited.

In one embodiment, entire changed BOs 120 or 152 (or the data values thereof) may be included within the update messages 184. In another embodiment, SaaS application 117 and master DB application 151 may employ a delta or incremental synchronization protocol in which only the pieces of data that were changed within the changed BOs 120 or 152 are included in the update messages 184. In yet another embodiment, an abbreviated protocol may be employed in which commands or values representing default pieces of data are included in the update messages 184 instead of the actual pieces of data (e.g., a command to delete a BO 120 or 152, a command to create a new BO 120 or 152 with specific data values in certain data fields, but default values in the unmentioned data fields, etc.). It is understood that the above are merely a few illustrative examples to which the disclosed subject matter is not limited.

In one embodiment, in a master DB application 151 supports or communicates with a plurality of SaaS applications 117 (not shown) or vice versa, a coherency protocol may be employed to minimize or reduce conflicting, invalid, or stale pieces of data or BOs 120 or 154 remaining in the system. For example, it may not be desirable for a first SaaS application 117 to change a BO, synchronize the changed BO with the master DB application 151, and before the master DB application 151 can synchronize the changed BO with a second SaaS application 117 have that second SaaS application 117 change the same BO. In such an embodiment, the two SaaS applications 117 would then have conflicting versions of the changed BO. Likewise a similar conflict may occur if only one master DB application 151 and SaaS application 117 are included in the system 100 as the same BO may be substantially simultaneously modified by both applications. In such embodiments, a coherency protocol may be employed to minimize or ameliorate such errors. For example, the master DB application 151 may be configured to identify conflicts or coherency issues and resolve the issue. In some embodiments, such resolution may include communicating coherency or conflict messages between the master DB application 151 and any or particular SaaS applications 117 associated with the master DB application 151. It is understood that the above are merely a few illustrative examples to which the disclosed subject matter is not limited.

In various embodiments, a protocol or scheme may be employed to prevent data from looping or bouncing between the SaaS application 102 and the Master DB application 151. In one embodiment, while a update message 184 from the SaaS application 117 to the master DB application 151 to cause a change in master BO 152, it would be undesirable for that change in the master 152 to cause a change event and a superfluous update message 184 from the master DB application 151 to the SaaS application 117. In such an embodiment, the master DB application 151 and SaaS application 117 may include one or more filters to prevent data from round-tripping, looping, or creating unnecessary update messages 184. In such an embodiment, synchronizing data may include determining if one or more pieces of data were changed due to a prior update event or message 184, and if so, not including those pieces of data in the current update message 184.

Figure 2:
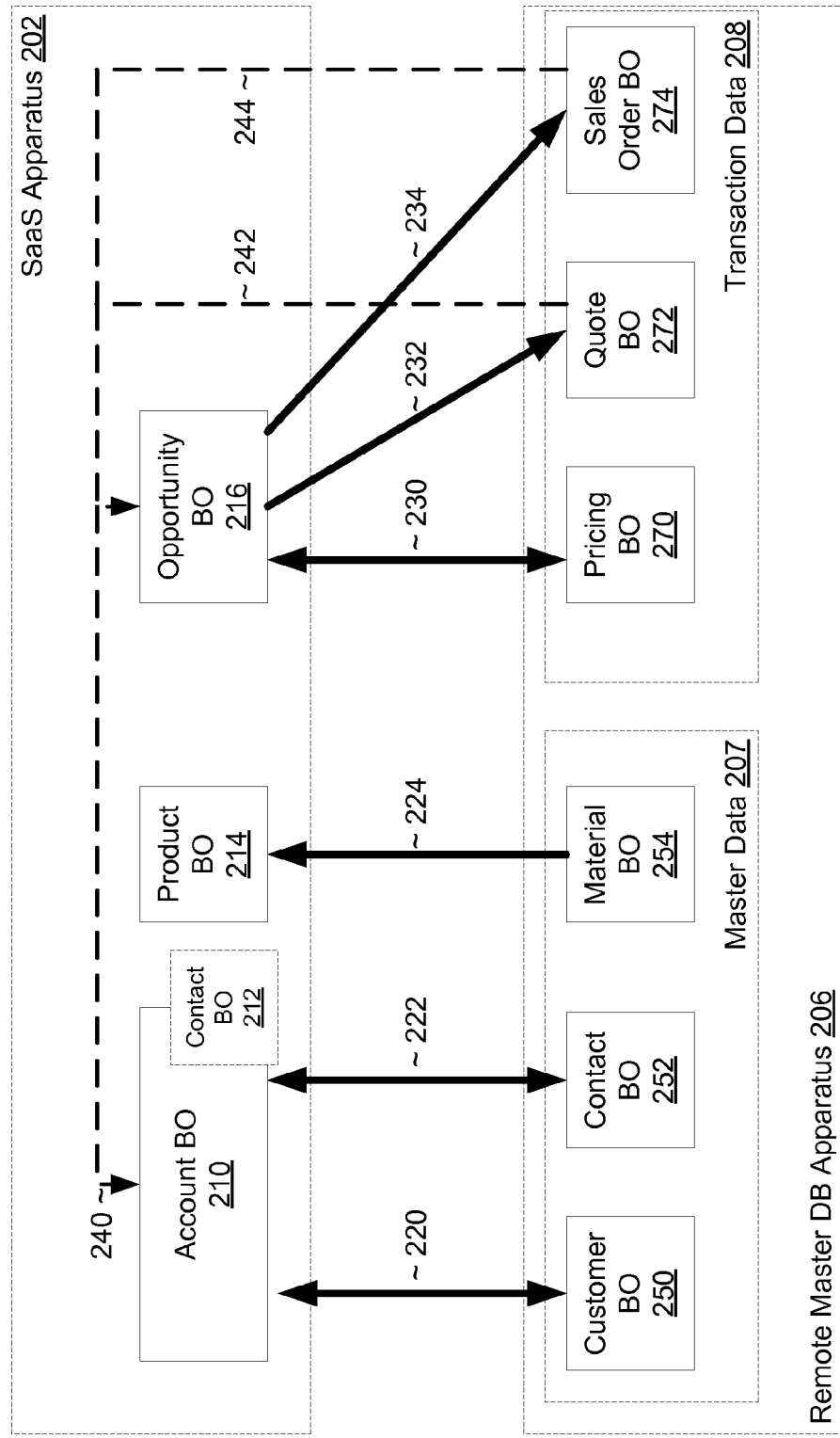
FIG. 2 is a block diagram of an example embodiment of a system in accordance with the disclosed subject matter.

FIG. 2 is a block diagram of an example embodiment of a system 200 in accordance with the disclosed subject matter. In one embodiment, the system 200 may include a specific embodiment of the system 100 to which the disclosed subject matter is not limited. In such an embodiment, the system 200 may include a SaaS apparatus 202 and a remote master DB apparatus 206, similar to those described above.

In one embodiment, the SaaS apparatus 202 may include or be configured to include a number of business objects (BOs). In the illustrated embodiment, the SaaS apparatus 202 may include BOs of the following types: an Account BO 210, a Product BO 214, and a Sales Opportunity BO 216.

In one embodiment, the Master DB Apparatus 206 may include or be configured to include a number of business objects (BOs). In the illustrated embodiment, Master DB apparatus 206 may include BOs of the following types: a Customer BO 250, a Contact BO 252, a Material BO 254, a Pricing BO 270, a Sales Quote BO 272, and a Sales Order BO 274. In such an embodiment, the a Customer BO 250, a Contact BO 252, a Material BO 254 may be included as Master Data 207 and such Master Data is generally the focus of the disclosed subject matter. Conversely, the Pricing BO 270, a Sales Quote BO 272, and a Sales Order BO 274 may be included as Transaction or Transactional Data 208, and is shown for illustrative purposes. In various embodiments, the Transactional Data 208 may derive, at least in part, from the Master Data 207.

FIG. 2 illustrates how master BOs may be mapped included by SaaS or local BOs and vice versa. FIG. 2 also illustrates that in some embodiments, the flow of information between the master and local BOs may be bidirectional or unidirectional based upon a set of predefined rules (e.g., included by an import and/or export BO manager, etc.).

For example, in the illustrated embodiment, the SaaS Account BO 210 does not directly correspond to a particular master BO. Instead, the Account BO 210 is cobbled together from or includes pieces of data derived from two master BOs, the Customer BO 250 and the Contact BO 252. For example, the Customer BO 250 may supply the Account BO 210 with a customer name data value and a customer address data value. In addition, the Master Contact BO 252 may supply the Account BO 210 with a work address data value. In such an embodiment, master export BO manager may pull these pieces of data out of their corresponding BOs 250 and 252 and transmit the data values to the SaaS apparatus 202. Upon receipt of the master data values, the SaaS apparatus' import BO manager may convert or re-format the three master data values, as needed, and then update corresponding data fields in the Account BO 210 with the converted data values.

Conversely, as arrows 220 and 222 show that the Account BO 210, Customer BO 250, and Contact BO 252 allow bi-directional synchronization or communication, when a change in the Account BO is detected the SaaS date values are transmitted by the SaaS export BO manager to the Master DB apparatus 206. Upon receipt of the SaaS data values, the Master DB apparatus' import BO manager may convert or re-format the three SaaS data values, as needed, and then update corresponding data fields in the Customer BO 250 or Contact BO 252 with the converted data values.

In one embodiment, the Master Customer BO 252 may have a substantially equivalent SaaS Contact BO 212 within the SaaS apparatus 202. In one embodiment, the SaaS Contact BO 212 may be included by the Account BO 210. This illustrates that the Master BOs and SaaS BOs need not be different or involve a many-to-one or portion-to-one mapping. In such an embodiment, the export BO managers may be able to transmit the respective Contact BO 252 or 212 in their entirety as opposed to as pieces of data. In various embodiments, a certain amount of remapping or reformatting may still be required by the receiving import BO manager as the BOs 252 and 212 may only be substantially equivalent and not exactly equal. It is understood that the above is merely one illustrative example to which the disclosed subject matter is not limited.

Along those lines, the Master Material BO 254 may, in one embodiment, be substantially equivalent to the SaaS Product BO 214. In various embodiments, the Master Material BO 254 may include more detail or more data fields than the SaaS Product BO 214. In such an embodiment, that the Material BO 254 may be considered to substantially include a superset of information or data included by the Product BO 214. For example, the Material BO 254 may include information regarding cost-of-production, failure rate, manufacturing yields, etc. that may not be included in the Product BO 214. In such an embodiment, the Product BO 214 may include only data fields needed for the sale of the product (e.g., product name, availability, stock-keeping unit (SKU) number, etc.), which would also be included by the Material BO 254.

In the illustrated embodiment, arrow 224 illustrates that the communication involving the Material BO 254 and the Product 214 may include unidirectional communication from the Master DB apparatus 206 to the SaaS apparatus 202. In such an embodiment, the SaaS export BO manager may be configured to not transmit or process data from the Product BO 214. Likewise, any changes in the Product BO 214 (if any are allowed within the SaaS application, e.g., a "sales notes" data field, etc.) would be ignored for purposes of synchronization with the master DB apparatus 206. Also, in some embodiments, a master import BO manager may be configured to ignore any pieces of data from the Product BO 214, or place those pieces of data from the Product BO 214 into another master BO (not shown) but not the Material BO 254. It is understood that the above is merely one illustrative example to which the disclosed subject matter is not limited.

The following illustrates how the Master Data 207 may be used to update or create various pieces of Transaction Data 208. The SaaS Sales Opportunity BO 216 illustrates a SaaS BO that consumes or receives data values from one transaction BO (Pricing BO 270) and provides data values or pieces of data to a plurality of Transaction BOs (Pricing BO 270, Quote BO 272, and Sales Order BO 274). In the illustrated embodiment, a number or a subset of the data fields or pieces of data included by the Sales Opportunity BO 216 may be imported or replicated from the Pricing BO 270 on the master DB application 206 using a procedure similar to that described above.

As arrow 230 shows, the portions of the Sales Opportunity BO 216 and the Pricing BO 270 allow bi-directional synchronization or communication. In one embodiment, the SaaS export BO manager may be configured to only export to transmit the portions or data fields that have equivalents or corresponding data fields in the Pricing BO 270.

As arrows 232 and 234 illustrate the communication involving the Sales Opportunity BO 216, the Sales Quote BO 272, and the Sales Order BO 274 may include unidirectional communication from the SaaS apparatus 202 to the Master DB apparatus 206. In one embodiment, a user of the SaaS apparatus 202 or a client device that makes use of the SaaS apparatus 202 make change the Sales Opportunity BO 216 (e.g., a sales representative user may enter sales quote made to a customer, and/or a sales order made by a customer, etc.). These changes may be reported or synchronized with the Master DB apparatus 206.

In such an embodiment, the Master export BO manager may be configured to not transmit or process data from either the Sales Quote Product BO 272 or Sales Quote BO 274. Likewise, any changes in the Sales Quote Product BO 272 or Sales Quote BO 274 (if any are allowed within the Master application, e.g., a "delivery note" data field, etc.) would be ignored for purposes of synchronization with the SaaS apparatus 202. Also, in some embodiments, a SaaS import BO manager may be configured to ignore any pieces of data from the Sales Quote Product BO 272 or Sales Quote BO 274, or place those pieces of data from the BOs 272 or 274 into another BO (not shown) but not the Sales Opportunity BO 216. It is understood that the above is merely one illustrative example to which the disclosed subject matter is not limited.

The arrows 242 and 244 illustrate that, in some embodiments, communication between the Transaction Data 208 (e.g., Sales Opportunity BO 216, the Sales Quote BO 272, and the Sales Order BO 274) may be bidirectional. It is understood that the above are merely a few illustrative examples to which the disclosed subject matter is not limited.

Arrow 240 illustrates that, in one embodiment, the Account BO 210 may also include or be configured to receive unidirectional communication from either the Sales Quote BO 272 and/or the Sales Order BO 274. In such an embodiment, a SaaS BO or in another embodiment a Master BO) may be associated with or have data fields or data values updated by a relatively large number of BOs. In some embodiments, a particular data field may even be updated by two or more BOs (not illustrated). It is understood that the above are merely a few illustrative examples to which the disclosed subject matter is not limited.

Figure 3:
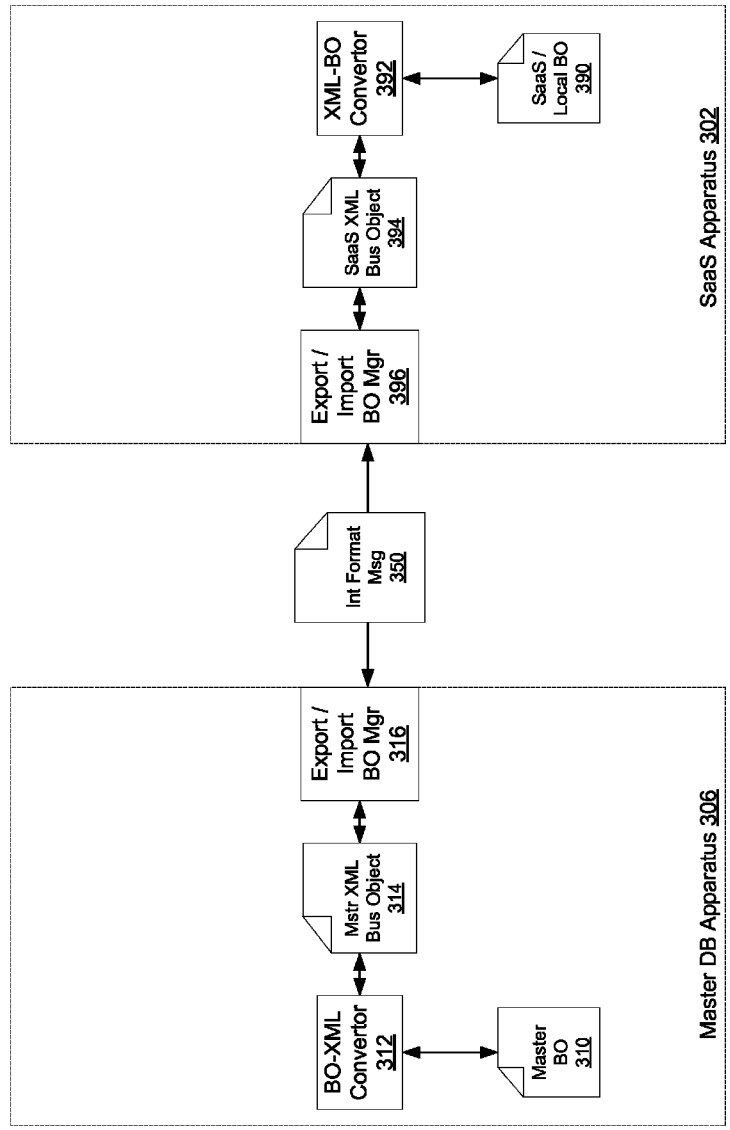
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include a SaaS apparatus 302 and a master DB apparatus 306. In one embodiment, the system 300 illustrates a more detailed embodiment of the synchronization and replication of data between a SaaS apparatus 302 and a master DB apparatus 306. In this example, a master business object (BO) 310 is substantially equivalent to a SaaS or local BO 390.

In one embodiment, the Master DB apparatus 306 may include or store a master BO 310. As part of the replication or synchronization process, the Master BO 310 may be converted from whatever internal storage format is used for the Master BO 310 (e.g., binary storage, register memory values, etc.) to a text-based format. In some embodiments, this conversion may be performed by a BO-XML Convertor 312.

In the illustrated embodiment, the text-based format may include an XML format and the XML version of the Master BO 310 and is represented by XML BO 314. It is understood that the use of the XML format is merely an illustrative example to which the disclosed subject matter is not limited. In a specific embodiment, the XML BO 314 may include a BO represented in the SAP Intermediate Document (IDoc) format, which is similar to XML but may differ in syntax.

In one embodiment, the XML BO 314 may then be processed by an Export BO manager 316 that is included by the Master DB apparatus 306. As described above, the Export BO manager 316 may convert the XML BO 314 or portions thereof into another format or protocol. For example, an Intermediate Format Message 350 may be created that encapsulates or includes various data values of the XML BO 314. As described above, the selected pieces of master BO data may be selected based upon the originating BO 310 (e.g., a Customer BO, a Pricing BO, etc.) or based upon which pieces of data have changed since the last synchronization event, or based upon other predefined rules.

In various embodiments, the Intermediate Formatted Message 350 may include a message formatted according to the SOAP format and may be transmitted to the SaaS apparatus 302 using the HTTP or HTTPS protocol. It is understood that the above is merely one illustrative example to which the disclosed subject matter is not limited.

In various embodiments, the Intermediate Formatted Message 350 may be received by the SaaS apparatus 302 via the included Import BO manager 396. As described above, the Import BO manager 396 may convert or change the received pieces of master data into corresponding prices of SaaS or local data. In the illustrated embodiment, this may result in a SaaS or local XML BO 394. In various embodiments, this SaaS or local XML BO 394 may include or make use of the IDoc format.

In some embodiments, the SaaS apparatus 302 may include an XML-BO convertor 392 configured to convert the text-based XML BO 394 to a binary-based or otherwise locally more accessible format. In such an embodiment, the XML-BO convertor 392 may alter or generate the SaaS or local BO 390 with the new pieces of data provided by or derived from the changed Master BO 310.

In the illustrated embodiment, the communication between the Master BO 310 and the SaaS or local BO 390 may be bi-directional. In such an embodiment, one skilled in the art would understand that the communication from the SaaS apparatus 302 to the master DB apparatus 306 may be similar to the reverse of that described above.

Figure 4:
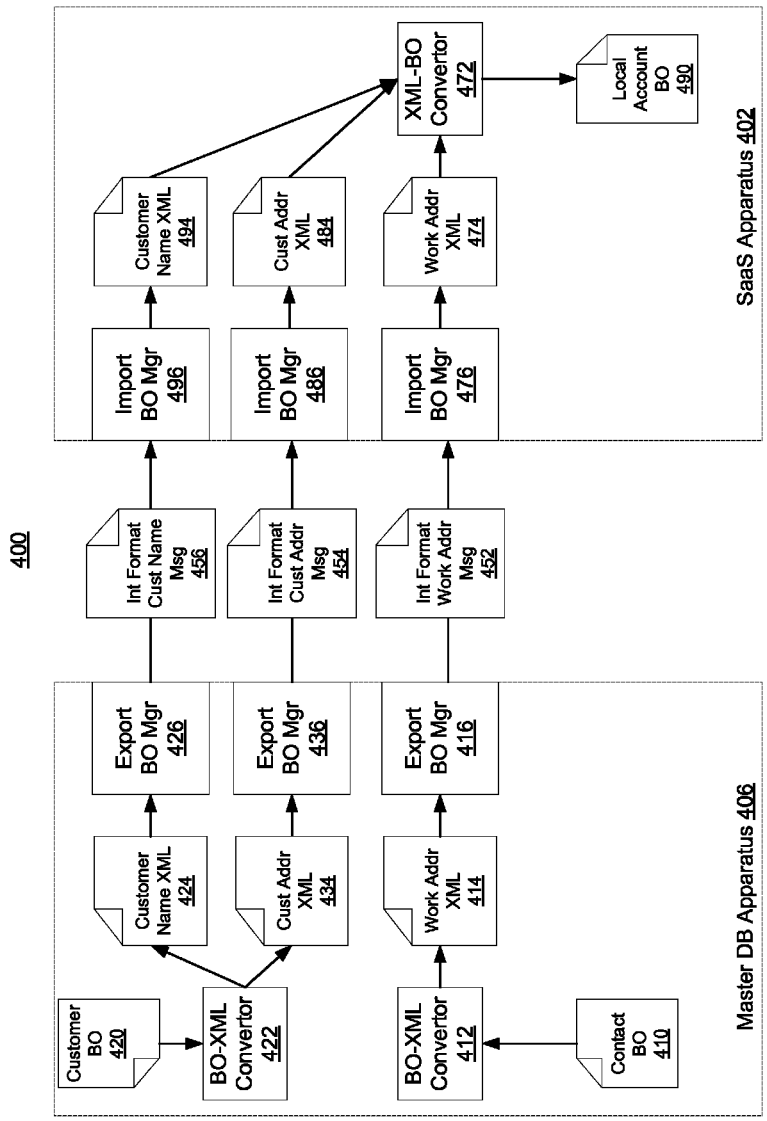
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may include a SaaS apparatus 402 and a master DB apparatus 406. In one embodiment, the system 400 illustrates a more detailed embodiment of the synchronization and replication of data between a SaaS apparatus 402 and a master DB apparatus 406. In this example, a SaaS or local business object (BO) 490 is created or updated based upon a plurality of master BOs 410 and 420. In the illustrated embodiment, the communication is unidirectional and originates from the Master DB apparatus 406.

In one embodiment, the Master DB apparatus 406 may include or store a master Contact BO 410. As part of the replication or synchronization process, the Master Contact BO 410 may be converted from whatever internal storage format is used for the Master Contact BO 410 (e.g., binary storage, register memory values, etc.) to a text-based format. In some embodiments, this conversion may be performed by a BO-XML Convertor 412 included by the Master DB apparatus 406.

As described above, in various embodiments, the text-based format may include an XML, IDoc, or other format. However, in the illustrated embodiment, the entire Contact BO 410 is not converted (although in another embodiment, it may be). In such an embodiment, the BO-XML Convertor 412 may only convert or may select the data field or piece of master data desired to make or modify the SaaS or local Account BO 490. In the illustrated embodiment, only the "Work Address" data field and its value are converted to the Word Address XML 414.

Likewise, in the illustrated embodiment, a similar process is occurring o the Customer BO 420. The two data fields of interest, "Customer Name" and "Customer Address", and their respective data values are converted by the BO-XML Convertor 422 into the Customer Name XML 424 and the Customer Address XML 434. In some embodiments, the Customer Name XML 424 and the Customer Address XML 434 may be included by a single file. In various embodiments, the BO-XML Convertors 412 and 422 may be included in a centralized or universal BO-XML Convertor.

In one embodiment, the XML BOs 414, 424, and 434 may then be processed by respective Export BO managers 416, 426, 436 that are included by the Master DB apparatus 406. In various embodiments, a single unified or centralized Export BO manager may be employed. As described above, the Export BO managers 416, 426, and 436 may convert the respective XML BOs 414, 424, and 434 or portions thereof into another format or protocol. For example, Intermediate Format Messages 452, 454, and 456 may be created that encapsulates or includes various data values of the respective XML BOs 414, 424, and 434. Again, in various embodiments, the pieces of data selected by the Export Bo Manager may be included in a unified or grouped series (e.g., by originating BOs, etc.) Intermediate Formatted Messages.

In various embodiments, the Intermediate Formatted Messages 452, 454, and 456 may be received by the SaaS apparatus 402 via the included respective Import BO managers 476, 486 and 496. As described above, the Import BO managers 476, 486 and 496 may convert or change the received pieces of master data into corresponding prices of SaaS or local data. In the illustrated embodiment, this may result in a SaaS or local XML BOs 474, 484, and 494. In various embodiments, these SaaS or local XML BOs 474, 484, and 494 may be grouped into one or more XML-BOs.

In some embodiments, the SaaS apparatus 402 may include an XML-BO convertor 472 configured to convert the text-based XML BOs 474, 484, and 494 to a binary-based or otherwise locally more accessible format. In such an embodiment, the XML-BO convertor 472 may alter or generate the SaaS or local BO 490 with the new pieces of data provided by or derived from the changed Master BOs 410 and 420.

In some embodiments (e.g, an ERP system), the SaaS apparatus 402 may not have BOs per se, but may use or include different tables or data structures. In one illustrative embodiment, there may be three IDoc messages that collect data from these tables. In such an embodiment, the IDoc messages may include: customer and contact general data (DEBMAS), customer address (ADRMAS), and contact address (ADR3MAS).

In some embodiments, the corresponding Web Services may be processed in a predefined sequence. For example, in various embodiments, the DEBMAS data may be processed first, as it creates a business partners general data, than addresses of business partner may be updated. In such an embodiment, there may also be several BOs. The data will be distributed to these BOs based on the business logic (e.g. such BOs may include: Customer, Business Partner Template (for contacts), BP Relationship (for relationship between customer and contact), DO Address, etc. It is understood that the above are merely a few illustrative examples to which the disclosed subject matter is not limited.

Figure 5:
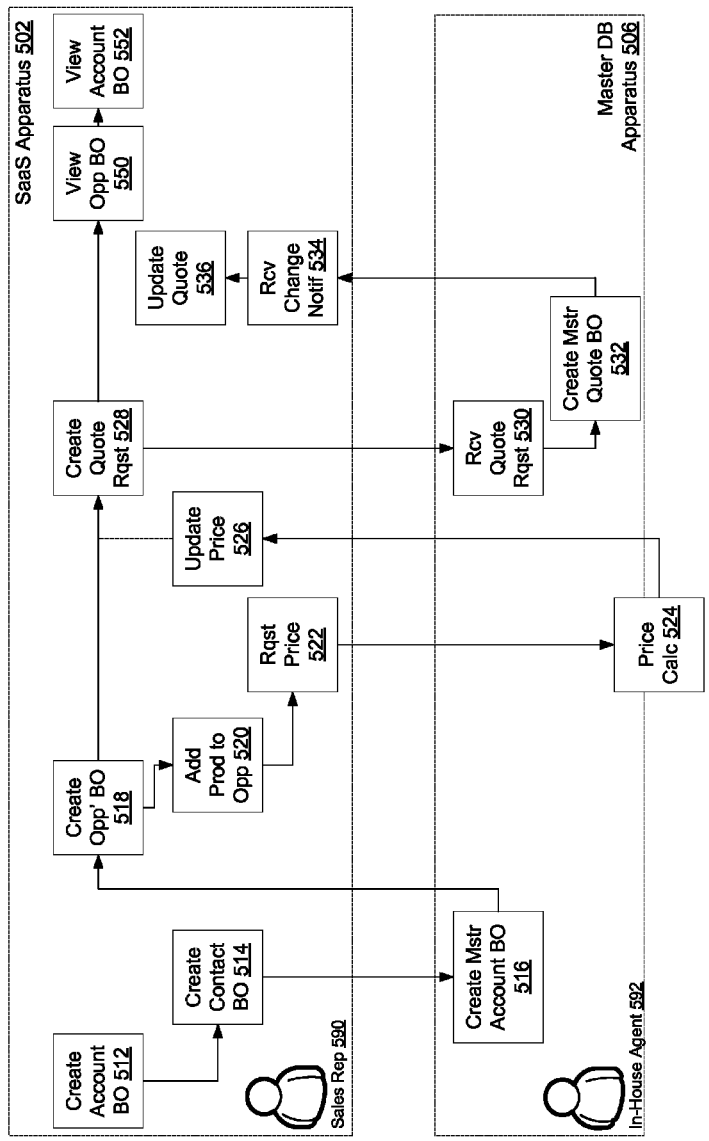
FIG. 5 is a block diagram of an example embodiment of a system in accordance with the disclosed subject matter.

FIG. 5 is a block or process diagram of an example embodiment of a system 500 in accordance with the disclosed subject matter. FIG. 5 highlights a particular usage scenario in which a sales representative 590 makes use of the system 500. It is understood that the above is merely one illustrative example to which the disclosed subject matter is not limited. For example, in another embodiment, another example may include a Purchasing scenario for Subsidiaries. It is understood that the above are merely a few illustrative examples to which the disclosed subject matter is not limited.

In various embodiments, the system 500 may include a SaaS apparatus 502 and a master DB apparatus 506. In one embodiment, the SaaS apparatus 502 may be operated by a SaaS user or Sales Representative 590. In such an embodiment, the Sales Representative 590 may indirectly control or operate the SaaS apparatus 502, for example via a client computing device (not shown), as described above. In various embodiments, the Master DB apparatus 506 may the operated by one or more Master DB user or In-House Agent 592.

Block 512 illustrates that, in one embodiment, the Sales Representative 590 may create an Account BO using the SaaS apparatus 502. For example, the sales representative may be going to a trade fair or some such event in which potential clients will be. Block 514 illustrates that, in one embodiment, the Sales Representative 590 may also create a Contact BO using the SaaS apparatus 502. For example, the Sales Representative 590 has the telephone number or email of the potential client's purchasing employee. As described above, in some embodiments, this Contact BO may be included by the SaaS Account BO as a sub-object.

Block 516 illustrates that, in one embodiment, the SaaS apparatus 502 may synchronize the SaaS Account BO and the Contact BO with the Master DB apparatus 506. As described above, in various embodiments, the replication of the Account BO may occur in an asynchronous fashion such that the In-House Agent 592 need not wait for the update. This is contrasted with the replication of transaction data which may occur in a synchronous fashion at predefined times or in response to a handshake protocol. It is understood that the above are merely a few illustrative examples to which the disclosed subject matter is not limited.

In an embodiment in which the Contact BO is replicated to the Master DB apparatus 506, the Master DB apparatus 506 may create a new master Account BO. In another embodiment, as described above, the Master DB apparatus 506 may create two new master BOS, a Customer BO and a Contact BO. It is understood that the above is merely one illustrative example to which the disclosed subject matter is not limited. The data from the SaaS Account BO is not in the Master DB application and may be accessed, modified, and generally used by the In-house Agent 592 if they wish.

Block 518 illustrates that, in one embodiment, the Sales Representative 590 may create an Opportunity BO on the SaaS apparatus. As described above, the Opportunity BO, Pricing BO, Quote BO, etc. may include Transaction Data; whereas the Account BO may be considered a piece of Master data.

In one example, the potential client's purchasing employee may have expressed a need and the Sales Representative 590 may think that a sale can be made. As the SaaS's Opportunity BO may not have an equivalent BO within the Master DB apparatus 506, the information or data included by the Opportunity BO may not synchronized with the Master DB apparatus 506.

Block 520 illustrates that, in one embodiment, the Sales Representative 590 may associate or include a Product BO with the Opportunity BO. In various embodiments, if the SaaS's Product BO has already been synchronized with an equivalent master BO (e.g., a Material BO, etc.) the SaaS may not need to replicate or synchronize any data at this point.

Block 522 illustrates that, in one embodiment, the Sales Representative 590 may make a request to the master DB apparatus for a particular price for a given product. In various embodiments, this may result in a message being sent to the Master DB apparatus 506. In such an embodiment, the message may include various data fields or values (e.g., the product number of the product whose price is requested, an expected number of the product to be sold, etc.).

Block 524 illustrates that, in one embodiment, the master DB apparatus 506 may be configured to respond to the pricing request message with a data value or master BO (e.g., Pricing BO, etc.). In various embodiments, the master DB apparatus 506 may be configured to inform the In-House Agent 592 that the pricing request has been made and allow the In-House Agent 592 to alter or approve the data value or master BO to be transmitted to the SaaS apparatus 502. In one embodiment, the master DB apparatus 506 may determine whether or not to seek the aid of an In-House Agent 592 based upon a predefined set of rules (e.g., exceeding a quantity threshold, a particular product identifier, a particular level of demand associated with the product, a timeout threshold in which the In-House Agent 592 may respond, etc.). It is understood that the above are merely a few illustrative examples to which the disclosed subject matter is not limited.

Block 526 illustrates that, in one embodiment, the pricing response may be transmitted to and received by the SaaS apparatus 302. In such an embodiment, the one or more data fields of the Sales Opportunity BO may be populated based upon the data provided by the master DB apparatus 306, as described above.

Block 528 illustrates that, in one embodiment, the Sales Representative 590 may request a firm sales quote from the master DB apparatus 50 or the In-house Agent 592. Block 530 illustrates that, in one embodiment, the Sales Quote Request may be received by the master DB apparatus 506. Block 532, illustrates that, in one embodiment, upon receipt of the Sales Quote Request, either the master DB apparatus 506 or the In-House Agent 592 may create a master Sales Quote BO.

Block 534 illustrates that, in one embodiment, in response to the change event created when the Sales Quote BO was created in Block 534, a update message or, in various embodiments, a change notification may be sent to the SaaS apparatus 502. Block 536 illustrates that, in one embodiment, in response to the update message or change notification from the master DB apparatus 506, the Opportunity BO or at least the sales quote portion thereof may be updated, as described above.

Blocks 550 and 552 illustrates that, in one embodiment, the Sales Representative 590 may view the Opportunity BO and Account BOs. In some embodiments, the Sales Representative 590 may be notified (e.g., via a user interface element, such as a badge, icon, flashing element, etc.) that a particular BO or portion thereof may have been updated or synchronized with the mater DB apparatus 506. It is understood that the above are merely a few illustrative examples to which the disclosed subject matter is not limited.

In various embodiments, a similar process or series of actions may be performed for creating a Sales Order BO. However, in that case the Sales Order BO would be created by the SaaS apparatus 502 and synchronized to the Master DB apparatus 506. It is understood that the above is merely one illustrative example to which the disclosed subject matter is not limited.

FIG. 6 is a flow chart of an example embodiment of a technique 600 in accordance with the disclosed subject matter. In various embodiments, the technique 600 may be used or produced by the systems such as those of FIG. 1, 2, 3, 4, or 5. Although, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, a plurality of pieces of master data may be replicated from a physically remote master database to a software-as-a-service (SaaS) application, as described above. In various embodiments, replicating may include converting one or more master business objects to a replicating message that includes an intermediate transmittal format, and transmitting the replicating message to the software-as-a-service application, as described above.

In various embodiments, replicating may include transmitting three pieces of master data to the software-as-a-service application, as described above. In some embodiments, the three pieces of master data may include a customer name, a customer address, and a contact's work address, as described above. In another embodiment, the three pieces of master data replicated to the software-as-a-service include two pieces of master data from a first business object included by the remote master database and a third piece from a second business object included by the remote master database, as described above. In various embodiments, one or more of the action(s) illustrated by this Block may be performed by the apparatuses or systems of FIG. 1, 2, 3, 4, or 5, the import or export BO managers of FIG. 1, 3, or 4, as described above.

Block 604 illustrates that, in one embodiment, the plurality of pieces of master data may be converted into one or more pieces of local data of the software-as-a-service application, as described above. In some embodiments, converting may include combining the three pieces of master data into a single piece of local data, as described above. In such an embodiment, the single piece of local data may include a customer account business object, as described above. In another embodiment, converting may include mapping, based on a set of predefined rules, data values included by the pieces of master data to data values of a business object that includes the piece of local data, as described above. In yet another embodiment, converting may include converting the intermediate transmittal format of the replicating message to one or more local business objects, as described above. In various embodiments, one or more of the action(s) illustrated by this Block may be performed by the apparatuses or systems of FIG. 1, 2, 3, 4, or 5, the import or export BO managers of FIG. 1, 3, or 4, as described above.

Block 606 illustrates that, in one embodiment, one or more of either the pieces of master data or the pieces of local data may be changed, as described above. In various embodiments, one or more of the action(s) illustrated by this Block may be performed by the apparatuses or systems of FIG. 1, 2, 3, 4, or 5, the SaaS server application of FIG. 1, or the SaaS apparatus or Master DB apparatus of FIG. 1, 2, 3, 4, or 5, as described above.

Block 608 illustrates that, in one embodiment, the changed pieces of either master data or local data may be synchronized between the remote master database and the software-as-a-service application, as described above. In one embodiment, synchronizing may include selectively synchronizing only the pieces of the master data or local data which have changed since a prior data synchronization between the remote master database and the software-as-a-service application, as described above. In another embodiment, synchronizing may include determining a changed sub-portion of the changed pieces of either the master data or the local data and an unchanged sub-portion of the changed pieces of either the master data or the local data, and synchronizing only the changed sub-portion of the changed pieces of either the master data or the local data, as described above. In yet another embodiment, synchronizing may include converting one or more local business objects to a synchronizing message that includes an intermediate transmittal format, transmitting the synchronizing message to the remote master database, and wherein, receipt of the of the synchronizing message causes the remote master database to, convert the intermediate transmittal format of the synchronizing message to one or more master business objects, as described above. In various embodiments, one or more of the action(s) illustrated by this Block may be performed by the apparatuses or systems of FIG. 1, 2, 3, 4, or 5, the import or export BO managers of FIG. 1, 3, or 4, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
receiving, by a software-as-a-service apparatus, a plurality of pieces of master data from a physically remote master database, the software-as-a-service apparatus being communicatively coupled between the physically remote master database and a plurality of remote client devices;
replicating, to a software-as-a-service application operating on the software-as-a-service apparatus, the plurality of pieces of master data;
converting the plurality of pieces of master data into one or more pieces of local data of the software-as-a-service application;
determining whether one or more of the pieces of local data has changed through operation of the software-as-a-service application by a first of the plurality of remote client devices;
upon determining one or more of the pieces of local data has changed, synchronizing the pieces of local data that have changed between the remote master database and the software-as-a-service application;
determining whether one or more of the pieces of master data has changed at the physically remote master database based on an indication that a second of the plurality of remote client devices caused the change of the one or more of the pieces of master data; and
upon determining one or more of the pieces of master data has changed, synchronizing the pieces of master data— that have changed between the remote master database and the software-as-a-service application;
wherein:
the synchronizing of the pieces of local data includes:
converting one or more local business objects to a synchronizing message that includes an intermediate transmittal format,
transmitting the synchronizing message to the remote master database, and
wherein, receipt of the of the synchronizing message causes the remote master database to, convert the intermediate transmittal format of the synchronizing message to one or more master business objects; and
the synchronizing of the pieces of master data includes:
converting one or more local business objects to a synchronizing message that includes an intermediate transmittal format,
transmitting the synchronizing message to the remote master database, and
wherein, receipt of the of the synchronizing message causes the remote master database to, convert the intermediate transmittal format of the synchronizing message to one or more master business objects.

2. The method of claim 1,
wherein the receiving of the plurality of pieces of master data includes receiving three pieces of master data by the software-as-a-service apparatus; and
wherein the converting of the plurality of pieces of master data includes combining the three pieces of master data into a single piece of local data.

3. The method of claim 2, wherein the three pieces of master data include two pieces of master data from a first business object associated with the remote master database and a third piece from a second business object associated with the remote master database.

4. The method of claim 2,
wherein the three pieces of master data include a customer name, a customer address, and a contact's work address; and wherein the single piece of local data includes a customer account business object.

5. The method of claim 4, wherein the converting of the plurality of pieces of master data includes mapping, based on a set of predefined rules, data values included by the pieces of master data to data values of a business object that includes the piece of local data.

6. The method of claim 1, wherein the replicating of the plurality of pieces of master data includes:
converting one or more master business objects to a replicating message that includes an intermediate transmittal format;
transmitting the replicating message to the software-as-a-service application; and
wherein the converting of the one or more business objects includes converting the intermediate transmittal format of the replicating message to one or more local business objects.

7. The method of claim 1, wherein
the synchronizing of the pieces of local data includes selectively synchronizing only the pieces of the local data which have changed since a prior data synchronization between the remote master database and the software-as-a-service application, and
the synchronizing of the pieces of master data includes selectively synchronizing only the pieces of the master data which have changed since a prior data synchronization between the remote master database and the software-as-a-service application.

8. The method of claim 1, wherein
the synchronizing of the pieces of local data includes:
determining a changed sub-portion of the changed pieces of the local data and an unchanged sub-portion of the changed pieces of the local data, and synchronizing only the changed sub-portion of the changed pieces of the local data; and
the synchronizing of the pieces of master data includes:
determining a changed sub-portion of the changed pieces of the master data and an unchanged sub-portion of the changed pieces of the master data, and synchronizing only the changed sub-portion of the changed pieces of the master data.

9. An apparatus comprising:
a memory configured to store a plurality of pieces of local data;
a first network interface configured to receive, from a physically remote master database, a plurality of pieces of master data;
a second network interface communicatively coupled to a plurality of remote client devices; and
a processor configured to:
convert the plurality of pieces of master data into one or more pieces of local data,
store the one or more pieces of local data in the memory,
implement a software-as-a-service application;
change one or more of the pieces of local data in response to an operation of the software-as-a-service application by a first of the plurality of remote client devices,
receive, via the first network interface, an indication that a second of the plurality of remote client devices has caused a change to one or more of the pieces of master data, and
synchronize the pieces of master data and local data that have changed-between the remote master database and the software-as-a-service application.

10. The apparatus of claim 9, wherein
the first network interface is configured to receive a first number of pieces of master data; and
wherein the processor is further configured to combine the first number of pieces of master data into a second number of pieces of local data.

11. The apparatus of claim 10, wherein the first number of pieces of master data include two pieces of master data from a first business object associated with the remote master database and a third piece from a second business object associated with the remote master database.

12. The apparatus of claim 10, wherein
the first number of pieces of master data include a customer name, a customer address, and a contact's work address; and
wherein the second number of pieces of local data includes a customer account business object.

13. The apparatus of claim 12, wherein the processor is configured to convert by mapping, based on a set of predefined rules, data values included by the pieces of master data to data values of a business object that includes the piece of local data.

14. The apparatus of claim 9, wherein the first network interface is configured to receive the plurality of pieces of master data by:
receiving a replicating message that includes one or more master business objects that were converted into an intermediate transmittal format by the remote master database; and
wherein the processor is configured to convert the intermediate transmittal format of the replicating message to one or more local business objects.

15. The apparatus of claim 9, wherein the processor is further configured to selectively synchronize only the pieces of the master data or local data that have changed since a prior data synchronization between the remote master database and the apparatus.

16. The apparatus of claim 9, wherein the processor is further configured to:
determine a changed sub-portion of the changed pieces of the master data or the local data and an unchanged sub-portion of the changed pieces of the master data or the local data; and
synchronize only the changed sub-portion of the changed pieces of the master data and the local data.

17. The apparatus of claim 9, wherein the apparatus is configured to:
convert one or more local business objects to a synchronizing message that includes an intermediate transmittal format;
transmit the synchronizing message to the remote master database; and
wherein, receipt of the of the synchronizing message causes the remote master database to, convert the intermediate transmittal format of the synchronizing message to one or more master business objects.

18. A computer program product for synchronizing master data with a software-as-a-system apparatus, the computer program product being tangibly embodied on a non-transitory computer-readable medium and including executable code that, when executed, is configured to cause the software-as-a-system apparatus to:
receive a plurality of pieces of master data from a physically remote master database, the software-as-a-service apparatus being communicatively coupled between the physically remote master database and a plurality of remote client devices;

replicate, to a software-as-a-service application operating on the software-as-a-service apparatus, the plurality of pieces of master data;

convert the plurality of pieces of master data into one or more pieces of local data of the software-as-a-service application;

determine whether one or more of the pieces of local data has changed through operation of the software-as-a-service application by a first of the plurality of remote client devices;

upon determining one or more of the pieces of local data has changed, synchronizing the pieces of local data that have changed between the remote master database and the software-as-a-service application;

determine whether one or more of the pieces of master data has changed at the physically remote master database based on an indication that a second of the plurality of remote client devices caused the change of the one or more of the pieces of master data;

upon determining one or more of the pieces of master data has changed, synchronizing the pieces of master data— that have changed between the remote master database and the software-as-a-service application;

convert one or more local business objects to a synchronizing message that utilizes an intermediate transmittal format;

transmit the synchronizing message to the remote master database; and wherein, receipt of the of the synchronizing message causes the remote master database to, convert the intermediate transmittal format of the synchronizing message to one or more master business objects.

* * * * *